United States Patent Office 2,879,246
Patented Mar. 24, 1959

2,879,246

CHROMIC HYDROXIDE-FERRIC HYDROXIDE PIGMENT AND COATING COMPOSITION CONTAINING SAME

Julius Jackson, Westfield, N.J., assignor to E. I. du Pont de Nemours and Company, Wilmington, Del., a corporation of Delaware No Drawing. Application January 28, 1955
Serial No. 484,819

14 Claims. (Cl. 260—40)

This invention relates to the manufacture of coating compositions. More particularly, it relates to new pigments for use in the preparation of durable coating compositions.

Pigments to extend the outdoor life of coating compositions are known. Carbon black, titanium dioxide, basic lead carbonate, zinc oxide, iron blues, chrome yellows, and the like have all been used for this purpose in nitrocellulose lacquer, oil-modified alkyd resins and oleoresinous varnish formulations. However, most of the previously known durable pigments have shortcomings. Most of them are expensive. More important, most are characteristically colored; a formidable obstacle when a specific color, not available as a durable pigment, is desired or when a clear finish is desired. Important too is the fact that the quantity of pigment for maximum durability usually exceeds the amount necessary for proper color. Thus, in the automotive finish field, durability can be achieved only at a substantial sacrifice of the desirable semitransparent flash or two-tone effect. The large quantity of durable pigment necessary for a durable finish tends to make the finish opaque. More often, the industry sacrifices durability to retain the flash effect.

There is another group of pigments known as the nondurable pigments. These are usually cheaper than the durable pigments and some provide colors not available as durable pigments. These pigments do not add to the durability of the coating and in some cases may actually shorten the coating's life. For durable exterior finishes containing nondurable pigments, durable pigments are usually added to the coating composition. However, the color of the durable pigment may pose a serious problem to the formulator. Simultaneously achieving durability and the desired decorative effect may be a tedious and difficult task for him.

The obvious desideratum is an inexpensive, colorless, durable pigment readily dispersible in a variety of coating composition vehicles. Such a pigment would permit maximum flexibility in formulating durable coating compositions. Color, if desired, could be obtained from relatively small amounts of nondurable or other durable pigments. The durability would be provided by the colorless durable pigment in conjunction with any other durable pigments used. With a colorless durable pigment, one could formulate a varnish exhibiting substantially no color nor opacity, yet exhibiting durability comparable to that of the best pigmented films.

The object of this invention is to provide pigments readily dispersible in coating compositions that extend the life of the resulting coating film without imparting any appreciable color or opacity to the film. Another object is to provide coating compositions of extended outdoor life. A further object is to provide film-forming compositions which may be modified with other pigments, nondurable or durable, to produce durable exterior finishes having any desirable decorative effect. Other objects will appear hereinafter.

The objects are accomplished by a pigment comprising chromic hydroxide and ferric hydroxide in the molecular ratio of 70 chromic hydroxide: 30 ferric hydroxide to 95 chromic hydroxide: 5 ferric hydroxide. More specifically, the objects are accomplished by incorporating into coating compositions 2–50 parts, preferably 15–35 parts, per 100 parts by weight of the film-forming material of a pigment comprising 70–95 mol percent chromic hydroxide and 5–30 mol percent ferric hydroxide, preferably 80–85 mol percent chromic hydroxide and 15–20 mol percent ferric hydroxide.

The term "ferric hydroxide," as used in this specification, refers to the compound precipitated by the addition of an alkaline material to an aqueous solution of a ferric salt. This compound has also been called "hydrous iron oxide" or ferric oxide in chemical combination with water.

The term "chromic hydroxide," as used in this specification, refers to the compound precipitated by the addition of an alkaline material to an aqueous solution of a chromic salt. Chromic hydroxide is not meant to include "chromium oxide green" nor "Guignet's Green." Chromium oxide green is almost pure chromic oxide ($Cr_2O_3$) and is usually obtained by calcining a chromate with a reducing agent. Guignet's Green is said to be a partially hydrated chromium oxide and is usually made by fusing a mixture of a bichromate compound with boric acid. Guignet's Green cannot be made by simple precipitation in aqueous media from a chromium salt.

In a specific embodiment of this invention, the pigment is prepared by adding a solution of caustic soda to a solution containing 85 mol percent of a chromic salt such as chromic chloride and 15 mol percent of a ferric salt such as ferric chloride. The resulting precipitate is filtered and washed substantially free of soluble salts. It is then dried and pulverized in any conventional manner to give a brownish gray powder. The powder is then dispersed in a conventional coating composition vehicle by any of the well known dispersing or grinding techniques commonly practiced in the manufacture of pigmented coating compositions. The amount of pigment in the coating composition is preferably between about 15 and about 35 parts per 100 parts of the film-forming material (vehicle solids). The preferred film-forming materials for use in my invention include alkyd resins, oleoresinous varnishes and cellulose esters such as cellulose nitrate.

The preparation and use of the pigments and the coating compositions of this invention are shown in detail in the examples which follow.

*Example 1*

One method of preparing the pigment involved first dissolving 226 parts of chromic chloride ($CrCl_3 \cdot 6H_2O$) in 5000 parts of water. 41 parts of ferric chloride ($FeCl_3 \cdot 6H_2O$) was then dissolved therein and the solution heated to about 80° C. A solution of 90 parts of sodium hydroxide in 450 parts of water was then added over a period of about 20 minutes and the pH was adjusted to about 8.5. After stirring for about 20 minutes, the pigment was isolated by filtering, washing free of soluble salts and drying at 60° C. 120 parts of a brownish gray pigment was obtained which, after pulverizing to a dry powder, was ready to disperse in any desired coating composition vehicle.

The pigment was then used in a typical green enamel composition:

| | Parts |
|---|---|
| Polychloro copper phthalocyanine | 7 |
| Short oil alkyd resin (50% solids) | 216 |
| Modified melamine formaldehyde resin (60% solids) | 20 |
| Aromatic hydrocarbon solvent | 40 |
| Aliphatic hydrocarbon solvent | 40 |
| Cobalt naphthenate drier | 0.2 |
| Chromic hydroxide/ferric hydroxide pigment | 23 |

After 12 months' exposure to the outdoors, a steel panel coated with this enamel showed substantially no change in color or gloss and was substantially free from any blistering or cracking. In contrast, a steel panel coated with the same enamel but in the absence of any chromic hydroxide/ferric hydroxide pigment showed significant fading after 12 months' exposure accompanied by poor gloss retention and some blistering and checking.

Example 2

Another method for preparing the pigment utilizes the readily available and cheap compound, sodium dichromate. 298 parts of sodium dichromate ($Na_2Cr_2O_7 \cdot 2H_2O$) was dissolved in 1000 parts of water. A solution of 150 parts of sulfuric acid in 300 parts of water was then added, followed by the addition of 312 parts of sodium bisulfite ($NaHSO_3$) in 1000 parts of water. The sodium bisulfite was added over a period of about 1 hour, followed by a stirring period of about 1.5 hours. 96 parts of ferric chloride ($FeCl_3 \cdot 6H_2O$) was then added and stirred into solution. The volume was adjusted to 12000 parts and the temperature adjusted to about 80° C. A solution of about 210 parts sodium hydroxide in 1050 parts of water was then added over a period of about 20 minutes to give a pH of about 8.5. After 30 minutes of stirring, the pigment was isolated by filtering, washing free of soluble salts, drying at 60° C. and pulverizing to give 280 parts of a brownish gray powder. The product had the following analysis:

| | Percent |
|---|---|
| $Cr_2O_3$ | 50.35 |
| $Fe_2O_3$ | 10.43 |
| Loss on ignition | 38.02 |
| (By difference) probably $Na_2SO_4$ | 1.2 |

370 parts of sodium carbonate dissolved in 1750 parts of water may be used in this process in place of the sodium hydroxide. With either alkali, the amount used may be varied slightly from the figures specified in order to give a final pH of about 8.5.

The pigment was used to prepare a clear enamel coating composition containing:

| | Parts |
|---|---|
| Pigment | 42 |
| Short oil alkyd resin (50% solids) | 216 |
| Modified melamine formaldehyde resin (60% solids) | 20 |
| Aromatic hydrocarbon solvent | 40 |
| Aliphatic hydrocarbon solvent | 40 |
| Manganese naphthenate drier | 0.2 |

This composition was prepared by grinding the pigment with a portion of the resin and with sufficient solvent to give a suitable consistency in a ball mill. When a suitable state of fineness was achieved (after about 48 hours), the mill was discharged and the balance of the ingredients was incorporated by simple mixing to give a relatively transparent varnish with a light brownish color.

A steel panel coated with this clear varnish showed substantially no change in color, gloss or integrity of the film after exposure to the elements on a 45° south exposure for 12 months. In contrast, a steel panel coated with the same enamel vehicle in the absence of the pigment showed blistering after about 3 months under the same conditions of exposure and was badly checked at the end of 12 months.

Example 3

A composition similar to that given in Example 2 but using 38 parts of the chromic hydroxide/ferric hydroxide pigment and 4 parts of aluminum flake instead of 42 parts of the new pigment was prepared in the manner of Example 2. This composition displayed a light tan colored metallic enamel and showed the same excellent durability as the composition of Example 2. It was far superior to a similar enamel from which the new pigment was omitted.

Example 4

The pigment, prepared as in Example 2, was used in a yellow enamel composition:

| | Parts |
|---|---|
| Nickel complex of Azo Dye-p-chlor aniline→dihydroxy quinoline | 7 |
| Short oil alkyd resin (50% solids) | 216 |
| Modified melamine formaldehyde resin (60% solids) | 20 |
| Aromatic hydrocarbon solvent | 40 |
| Aliphatic hydrocarbon solvent | 40 |
| Manganese naphthenate drier | 0.2 |
| Chromic hydroxide/ferric hydroxide pigment | 23 |

This composition was applied to a panel to give a greenish yellow enamel of good hiding power. After 12 months' exposure, the coating retained its high gloss and color and the panels were substantially free of any evidence of film disintegration. Omitting the chromic hydroxide/ferric hydroxide pigment resulted in a film of similar color but of inferior durability.

Example 5

The pigment, prepared as in Example 2, was incorporated in a clear nitrocellulose lacquer:

| | Parts |
|---|---|
| Cellulose nitrate | 15.4 |
| Non-drying alkyd resin (60% solids) | 10.3 |
| Dibutyl phthalate | 4.6 |
| Castor oil | 3.1 |
| Active solvents | 27.2 |
| Alcohols | 15.8 |
| Aromatic hydrocarbons | 15.0 |
| Chromic hydroxide/ferric hydroxide pigment | 8.6 |

After exposure to the elements, a panel coated with this film showed less discoloration and better gloss retention than a similar panel coated with a similar lacquer containing no chromic hydroxide/ferric hydroxide pigment. Cracking and checking, observed in the case of the unpigmented clear vehicle, were completely absent when the pigmented vehicle was used.

Example 6

A metallized lacquer, identical to that of Example 5 except that 8.6 parts chromic hydroxide/ferric hydroxide pigment was replaced by 8.1 parts of the pigment and 0.5 part of aluminum powder, was prepared. The relatively colorless pigment was ground in a ball mill with the resin plasticizer portion of the mixture together with sufficient solvent to provide a suitable working consistency. The remaining ingredients, including aluminum powder in the form of a paste, were then incorporated by simple agitation to give a homogeneous product.

The resulting metallized lacquer, when applied to a test panel, exhibited excellent durability upon outdoor exposure. Omission of the chromic hydroxide/ferric hydroxide pigment provided a lacquer of similar appearance but of inferior durability.

Example 7

The pigment, prepared as in Example 2, was used in a blue enamel composition:

| | Parts |
|---|---|
| Copper phthalocyanine | 12.8 |
| Titanium dioxide pigment | 12.8 |
| Long oil soya modified alkyd resin (70% solids) | 390 |
| Aliphatic hydrocarbon solvent | 125 |
| Cobalt naphthenate drier | 1.0 |
| Chromic hydroxide/ferric hydroxide pigment | 43.4 |

Panels coated with this enamel showed after 12 months' exposure less bronzing, less chalking and less cracking than a panel coated with a similar enamel made without the chromic hydroxide/ferric hydroxide pigment.

The pigments of this invention are preferably prepared by coprecipitation, i. e., by the addition of an alkaline material to a solution containing sources of trivalent chromium and trivalent iron. Sources of trivalent chromium include the chromic salts such as the chloride, the fluoride, the sulfate, the nitrate and the like. A cheaper source of trivalent chromium is the soluble dichromates such as sodium dichromate. Reduction of the dichromate with sulfur dioxide or ferrous sulfate converts it to the trivalent chromium. A ferric salt such as the chloride, the sulfate, the nitrate and the like may supply trivalent iron, or a ferrous salt such as ferrous sulfate may be oxidized to supply the trivalent iron. Of the alkaline materials useful in the coprecipitating process, sodium hydroxide provides the best results. Sodium carbonate, potassium hydroxide, potassium carbonate and ammonium hydroxide may be used as alternatives for sodium hydroxide.

Besides coprecipitation, the chromic and ferric hydroxides may be prepared separately and mixed in the designated proportions of this invention during the preparation of the coating compositions. The resulting films display outstanding durability but do not retain gloss nor color (when used with colored pigments) as well as films containing the coprecipitated pigments.

From the preferred mode of preparation, coprecipitation, it is obvious that it is not intended for the hydroxides which make up the novel pigment to be stoichiometrically pure. The new pigments will usually contain some quantity of the anion from which the pigments are precipitated. In Example 2, I propose that the material not accounted for by analysis is probably sulfate ion present as the basic sulfate. However, what ever other ingredients the pigment may contain it, must contain chromic hydroxide and ferric hydroxide in molecular ratio of 70 chromic hydroxide: 30 ferric hydroxide to 95 chromic hydroxide: 5 ferric hydroxide. Above 30 mol percent ferric hydroxide, the pigment provides films that are too highly colored for the purpose of this invention. Below 5 mol percent ferric hydroxide, the pigment provides films that are not sufficiently durable.

The most surprising result achieved by the pigment of this invention is that it imparts very little color and opacity to the resulting film. Pure chromic hydroxide is a green pigment. The ferric oxides of varying degrees of hydration are all highly colored. Yet the combination of ferric hydroxide and chromic hydroxide in the stated critical proportions provides pigments displaying very little opacity and a very slight brownish color; ideally suited for the preparation of films of outstanding durability.

In formulating the coating compositions it is necessary to adhere to certain critical restrictions. The improvements of this invention are obtained when the chromic hydroxide/ferric hydroxide pigment represents 2–50 parts by weight per 100 parts of binder (vehicle solids). In using colored pigments, it is frequently true that as little as 5 parts of the colored pigment per 100 parts of binder will satisfy the color and hiding power requirements. However, it is generally agreed in the art that compositions of optimum durability require at least 10 parts of durable pigment per 100 parts of binder, usually in the range of 15–35 parts of pigment, and rarely exceeding 40 parts except with pigments of high specific gravity. Hence, additional pigmentation with a pigment exhibiting little color is desirable for optimum durability when the minimum amount of colored pigment is used; the chromic hydroxide/ferric hydroxide pigment is admirably suited for this purpose. Where substantially clear varnishes are required, the chromic hydroxide/ferric hydroxide pigment is particularly useful to provide the increased durability resulting from pigmentation with a minimum of color and opacity.

Thus, for optimum durability, about 15 parts of the chromic hydroxide/ferric hydroxide pigment per 100 parts of film-forming material is preferably used in some colored compositions; about 35 parts per 100 parts of film-forming material is preferred when the new pigment is used as the sole pigment ingredient. 2–50 parts of chromic hydroxide/ferric hydroxide pigment per 100 parts of film-forming material will exhibit superiority over similar compositions in which the pigment is absent.

The method for dispersing the pigment in the vehicle is not critical. The only requirement is that the method effectively disperses the pigment in the vehicle to such a degree that the final film is free from any appearance of grit. Grinding in a ball mill, grinding on a three roll ink mill, various forms of plastic milling and the like prove satisfactory.

This invention is not restricted to the film formers shown in the examples, i. e., short oil modified alkyds designed to be finished by baking, long oil alkyds designed for air-dry finishes and cellulose nitrate lacquers. Equally useful oil or linseed oil or other oleoresinous varnishes, modified urea formaldehyde resin varnishes, modified phenol formaldehyde resin varnishes as well as other synthetic resins and cellulose derivatives.

The invention is not meant to be restricted for use with the specific color pigments shown in the examples. Aluminum powder, yellow azo pigments, phthalocyanine pigments and titanium dioxide pigments are merely illustrative of the many commonly used varieties of pigments. Compositions containing chromic hydroxide/ferric hydroxide pigment in admixture with most pigments of both low and high durability would provide an improvement in durability.

This invention provides inexpensive coating compositions for preparing clear and colored varnishes and lacquers of substantially improved durability. The substantially colorless and colored formulations are useful wherever exposure to the elements is contemplated. Thus, the substantially colorless formulations are useful in varnishes for ship decks and the like; colored formulations for automobile finishes or enamels and the like. The use of chromic hydroxide/ferric hydroxide pigment in durable, colored finishes also offers a financial advantage since the new pigment is relatively inexpensive and can replace a substantial part of the more expensive colored pigment.

As many widely different embodiments can be made without departing from the scope of this invention, it is understood that the invention is not limited except as defined in the appended claims.

What is claimed is:

1. A coating composition comprising a major amount of an organic film-forming material and a minor amount of a chromic hydroxide/ferric hydroxide pigment in which the mol ratio of chromic hydroxide to ferric hydroxide ranges from 70:30 to 95:5.

2. A coating composition comprising an organic film-forming material containing 2–50 parts per 100 parts by weight of film-forming material of a chromic hydroxide/ferric hydroxide pigment in which the mol ratio of chromic hydroxide to ferric hydroxide ranges from 70:30 to 95:5.

3. A coating composition comprising an organic film-forming material containing a colored pigment and from 2-50 parts per 100 parts by weight of film-forming material of a chromic hydroxide/ferric hydroxide pigment in which the mol ratio of chromic hydroxide to ferric hydroxide ranges from 70:30 to 95:5.

4. A coating composition comprising an organic film-forming material containing about 15 to about 35 parts per 100 parts by weight of the film-forming material of a chromic hydroxide/ferric hydroxide pigment in which the mol ratio of chromic hydroxide to ferric hydroxide ranges from 70:30 to 95:5.

5. A coating composition comprising an organic film-forming material containing a colored pigment and from about 15 to about 35 parts per 100 parts by weight of the film-forming material of a chromic hydroxide/ferric hydroxide pigment in which the mol ratio of chromic hydroxide to ferric hydroxide ranges from 70:30 to 95:5.

6. A coating composition as in claim 1 wherein the organic film-forming material is an alkyd resin.

7. A coating composition as in claim 1 wherein the organic film-forming material is cellulose nitrate.

8. A coating composition as in claim 1 wherein the organic film-forming material is an oleoresinous varnish.

9. A pigment comprising chromic hydroxide and ferric hydroxide in the molecular ratio of 70 chromic hydroxide: 30 ferric hydroxide to 95 chromic hydroxide: 5 ferric hydroxide.

10. A pigment comprising a coprecipitated mixture of chromic hydroxide and ferric hydroxide in the molecular ratio of 70 chromic hydroxide: 30 ferric hydroxide to 95 chromic hydroxide: 5 ferric hydroxide.

11. A pigment comprising chromic hydroxide and ferric hydroxide in the molecular ratio of 80 chromic hydroxide: 20 ferric hydroxide to 85 chromic hydroxide: 15 ferric hydroxide.

12. A pigment comprising a coprecipitated mixture of chromic hydroxide and ferric hydroxide in the molecular ratio of 80 chromic hydroxide: 20 ferric hydroxide to 85 chromic hydroxide: 15 ferric hydroxide.

13. A process for preparing a pigment which comprises coprecipitating chromic hydroxide and ferric hydroxide by adding an alkaline material to a solution containing trivalent chromium and trivalent iron in the molecular ratios of 70 trivalent chromium: 30 trivalent iron to 95 trivalent chromium: 5 trivalent iron to provide a pH of about 8.5 and recovering and drying the flocculated precipitated chromic hydroxide and ferric hydroxide.

14. A coating composition comprising a major amount of an organic film-forming material and a minor amount of a pigment consisting essentially of coprecipitated chromic hydroxide and ferric hydroxide in which the mol ratio of chromic hydroxide to ferric hydroxide ranges from 70:30 to 95:5.

References Cited in the file of this patent

UNITED STATES PATENTS

| | | |
|---|---|---|
| 2,090,476 | Fireman | Aug. 17, 1937 |
| 2,544,636 | Peck | Mar. 6, 1951 |
| 2,604,414 | Pike | July 22, 1952 |

FOREIGN PATENTS

| | | |
|---|---|---|
| 431,286 | Great Britain | July 4, 1935 |